United States Patent [19]

Fiornascente

[11] Patent Number: 4,709,587

[45] Date of Patent: Dec. 1, 1987

[54] FRICTION DRIVE FOR AUTOMOTIVE AND TRUCK ACCESSORIES

[76] Inventor: Nicola Fiornascente, 165 Valley Rd., Montclair, N.J. 07042

[21] Appl. No.: 902,950

[22] Filed: Sep. 2, 1986

Related U.S. Application Data

[63] Continuation-in-part of Ser. No. 727,766, Jun. 10, 1985, abandoned.

[51] Int. Cl.$^4$ .................... F16H 37/06; F02B 67/04
[52] U.S. Cl. .................... 74/15.63; 74/15.2; 74/206; 74/665 G; 74/721; 123/195 A; 123/198 R
[58] Field of Search .............. 74/15.2, 15.63, 206, 74/665 G, 721, 214, 209, 213, 215; 123/195 A, 198 C, 198 R; 180/53.8

[56] References Cited

U.S. PATENT DOCUMENTS

| | | | |
|---|---|---|---|
| 808,423 | 12/1905 | Winton | 123/195 A |
| 879,676 | 2/1908 | Ryan | 74/215 X |
| 921,705 | 5/1909 | Hubbell | 123/198 R |
| 1,289,818 | 12/1918 | Kurkjian | 74/209 |
| 1,391,238 | 9/1921 | Bried | 74/215 |
| 1,391,572 | 9/1921 | Nickel | 74/209 |
| 1,399,329 | 12/1921 | Vandercook | 74/206 |
| 1,414,513 | 5/1922 | Hueber | 180/53.8 X |
| 1,416,569 | 5/1922 | Minnich | 74/209 |
| 1,624,738 | 4/1927 | Jesperson | 123/195 A |
| 2,224,309 | 12/1940 | Mack | 74/213 X |
| 2,859,627 | 11/1958 | Gallop, Jr. | 74/665 G X |
| 3,094,006 | 6/1963 | Hamilton | 74/215 X |
| 3,187,674 | 6/1965 | Hammelmann | 74/207 |
| 3,202,144 | 8/1965 | Nicholson et al. | 74/215 X |
| 3,452,610 | 7/1969 | Beasley et al. | 74/15.63 X |
| 3,717,045 | 2/1973 | Burenga | 74/15.6 |
| 4,321,896 | 3/1982 | Kasting | 123/195 A |
| 4,373,483 | 2/1983 | Bury | 123/198 C |

FOREIGN PATENT DOCUMENTS 354907  6/1922  Fed. Rep. of Germany ... 123/195 A

Primary Examiner—Allan D. Herrmann
Attorney, Agent, or Firm—Siegmar Silber

[57] ABSTRACT

A friction drive arrangement for driving automotive and truck accessories from the automotive/truck engine comprising a drive wheel, with an outer rim surface, for mounting on an output shaft of the engine and one or more driven wheels for driving the accessories and having portions thereof mating frictionally with the drive wheel outer rim surface.

4 Claims, 2 Drawing Figures

FRICTION DRIVE FOR AUTOMOTIVE AND TRUCK ACCESSORIES

CROSS-REFERENCES TO RELATED APPLICATION

This application is a continuation-in-part of a patent application filed by the same inventor, entitled, "Elimination of Pulleys and Belts on Future Automobiles and Trucks," bearing Ser. No. 06/727,766 and having a filing date of June 10, 1985 now abandoned.

BACKGROUND OF THE INVENTION

1. Field of the Invention

This invention relates to friction drives in general, and more particularly, to drive means for automotive and truck accessories.

2. Description of the Related Art.

No pre-examination search had been performed prior to lodging the parent application. However, constituting information disclosed and known to the Applicant is the Examiner's search performed during the course of prosecution. The Examiner's search provided from Class 74/15.6, 15.63, 206, 207, 215, and 665G; 123/195A, 198C, and 198R; and 180/53.8 the following references, which were made of record:

| Patent No. | Inventor | Date |
| --- | --- | --- |
| 4,373,483 | Bury | 2/15/83 |
| 4,321,896 | Kasting | 3/30/82 |
| 3,717,045 | Burenga | 2/20/73 |
| 3,452,610 | Beasley et al | 7/1/69 |
| 3,187,674 | Hammelmann | 6/8/65 |
| 3,094,006 | Hamilton | 6/18/63 |
| 2,859,627 | Gallop | 11/11/58 |
| 1,624,738 | Jesperson | 4/2/27 |
| 1,414,513 | Hueber | 5/2/22 |
| 1,399,329 | Vandercook | 12/6/21 |
| 921,705 | Hubbell | 5/18/09 |
| 808,423 | Winton | 12/26/05 |
| 3,54,907(German) | Woerner | 6/16/22 |

Of the above references, the Examiner applied Beasley et al in view of Vandercook. By the disclosure provided hereby, further elaboration and clarity is brought to the instant invention in a manner which distinguishes over the art previously uncovered.

In the past such friction drives and gear trains used to operate automotive and truck accessories, did not resolve the technical problems of the positive response required.

SUMMARY OF THE INVENTION

The friction drive arrangement of this disclosure is for driving automotive and truck accessories. A drive wheel is attached to the output shaft of the automotive truck engine and operates in a manner so as to coact with a driven wheel or a set of driven wheels. Each driven wheel assembly includes a set of O-rings to provide the proper function drive arrangement. The O-rings are under both tension and compression and have been found to be long-wearing and relatively maintenance free.

DESCRIPTION OF THE PREFERRED EMBODIMENT

In the specification which follows a friction drive arrangement for automotive and truck accessories is described in detail. For purposes of economy of style, the best mode of practicing the invention is described in connection with automotive accessories; however, the teaching hereof is equally applicable to truck accessories. Similarly, although the invention is described in connection with a gasoline-powered internal combustion engine, the teaching hereof is applicable to any other engine that provides rotating forces to an output shaft thereof.

Figure 1:
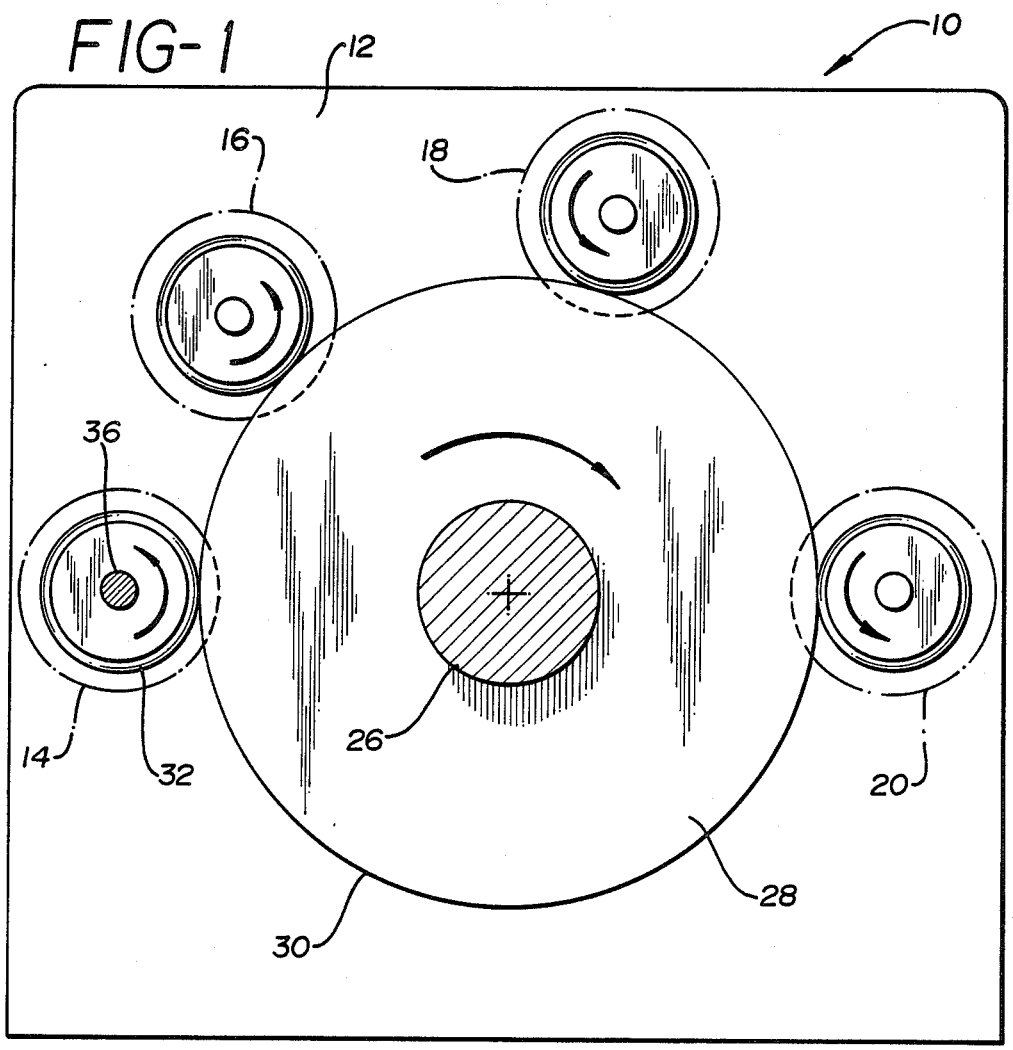
FIG. 1 is a front elevational view of the mounting plate, automotive accessories and friction drive arrangement therefor; and, FIG. 2 is a perspective view of the driven wheel assembly of this invention, which view is partially cut away to illustrate the O-ring arrangement.
Figure 2:
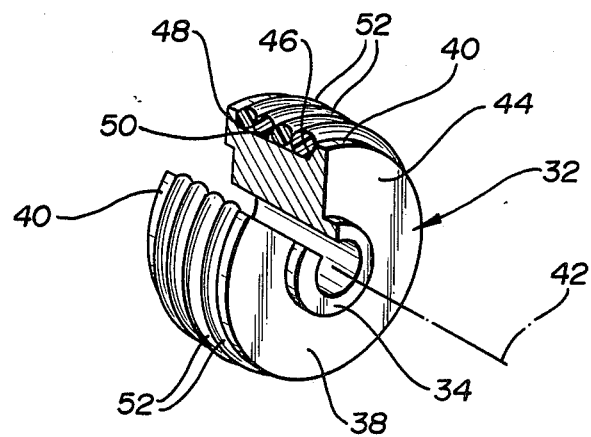

Referring now to FIG. 2, the friction drive arrangement of this invention is shown and is referred to generally by the numeral 10. The friction drive arrangement 10 includes a base plate 12 for mounting of automotive accessories 14, 16, 18 and 20, respectively, an alternator 14, water pump 16, pollution pump 18, and air conditioner 20. On the output shaft 26 of the engine (not shown) is mounted a drive wheel 28 with a smooth, broad outer rim 30 which is well-suited for receiving friction drive components.

Referring now to FIG. 2 a detailed perspective view of the driven wheel assembly is shown with a portion thereof cutaway to illustrate the O-rings. The driven wheel assembly 32 has at the center thereof hub 34 for concentrically mounting the driven wheel assembly 32 onto the input shaft 36. The hub 34 is constructed to support, through a web or central driven wheel portion 38, a cylindrical rim 40 having the same central axis 42 as the driven wheel. An outer wall 44 of the cylindrical rim 38 has at either end a flanged portion 46 and 48 extending radially outward and defining an O-ring receiving channel 50 therebetween. Filling the receiving channel and extending radially and outwardly beyond the channel, a set of annular drive means or O-rings 52 are arrayed. In general, it has been found that sets of not less than three nor more than five are preferred. The O-rings 52 are elastic, compressible and resilient and, are constructed to have, at rest, an inner diameter slightly small than the outer diameter of the cylindrical rim.

In operation, the O-rings 52 are stretched to fit over the flanged portion 46 or 48 and the requisite number of O-rings are placed side-by-side so that the O-ring receiving channel is filled. Upon installation, the O-rings 82 of the set are compressed one against the other and between the flanged portions 46 and 48. The driven wheel assembly 32 thus having been completed is installed onto the accessory of choice, for example, alternator 14 by fastening the hub 34 onto the input shaft 36. The accessory is then, in turn, mounted so that the driven wheel assembly 32 is in close proximity to the outer rim 30 of drive wheel 28. The accessory position is further adjusted until a predetermined pressure is exerted on driven wheel assembly 32.

While the invention shown in this application specifically discloses the best mode of the invention known, variations of details may be introduced by those skilled in the art without departing from the spirit of the disclosure which is further clearly delineated in the claims that follow.

I claim:

1. A friction drive arrangement for driving automotive and truck accessories, each with an input from the automotive/truck engine thereof comprising in combination:
   a drive wheel for mounting on an output shaft of said engine having an outer rim surface;
   one or more driven wheels for driving said accessories having portions thereof mating frictionally with said outer rim surface, said driven wheels further comprising:
   hub means for concentrically mounting the driven wheel onto the input shaft;
   a cylindrical rim supported by said hub means and formed axially thereabout;
   a pair of end flanges extending radially outward from the ends of the cylindrical rim;
   plurality of elastic o-rings for transmitting driving forces resiliently mounted adjacently and compressively to said cylindrical rim and within said end flanges, said elastic O-rings having an inner diameter slightly less that of said cylindrical rim and being dimensioned so that each o-ring can be mounted over one of said end flanges and dimensioned to extend radially beyond said end flanges and to form axially disposed, substantially V-shaped grooves between adjacent elastic o-rings;
   whereby said drive wheel transmits rotational forces to said accessories.

2. A friction drive arrangement as described in claim 1 wherein the O-rings when mounted side by side about the rim are compressed by one another and the end flanges, and fill the axial space between said flange.

3. A friction drive arrangement for driving automotive and truck accessories, each with an input shaft, from the automotive/truck engine thereof comprising in combination:
   a drive wheel for mounting on an output shaft of said engine having an outer rim surface;
   one or more driven wheels for driving said accessories having portions thereof mating frictionally with said outer rim surface, said driven wheels further comprising:
   hub means for concentrically mounting the driven wheel onto the input shaft;
   a cylindrical rim supported by said hub means and formed axially thereabout;
   a pair of end flanges extending radially outward from the ends of the cylindrical rim;
   plurality of elastic o-rings for transmitting driving forces resiliently mounted adjacently and compressively to said cylindrical rim and within said end flanges, said elastic O-rings having an inner diameter slightly less than that of said cylindrical rim and being dimensioned so that each o-ring can be mounted over one of said end flanges and dimensioned to extend radially beyond said end flanges and to form axially disposed, substantially V-shaped grooves between adjacent elastic o-rings;
   said o-rings when mounted side by side about the rim are compressed by one another and the end flanges, and fill the axial space between said end flanges;
   whereby said drive wheel transmits rotational forces to said accessories.

4. A friction drive arrangement as described in claim 1 wherein ratio of the diameter of the drive wheel to the driven wheel is selected to increase or decrease the rotational speed of the input shaft of the accessory.

* * * * *